(12) United States Patent
Benedetto et al.

(10) Patent No.: US 10,933,331 B2
(45) Date of Patent: Mar. 2, 2021

(54) UTILIZING EARNED GAMEPLAY RESOURCES FOR METAGAMING

(71) Applicant: Sony Interactive Entertainment LLC, San Mateo, CA (US)

(72) Inventors: Warren M. Benedetto, Aliso Viejo, CA (US); Landon Noss, Laguna Niguel, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 105 days.

(21) Appl. No.: 15/864,638

(22) Filed: Jan. 8, 2018

(65) Prior Publication Data

US 2019/0209926 A1     Jul. 11, 2019

(51) Int. Cl.
*A63F 13/69*       (2014.01)
*A63F 13/35*       (2014.01)

(52) U.S. Cl.
CPC .............. *A63F 13/69* (2014.09); *A63F 13/35* (2014.09)

(58) Field of Classification Search
CPC ...... A63F 11/00; A63F 11/0074; A63F 13/35; A63F 13/69; A63F 13/847
See application file for complete search history.

(56) References Cited

U.S. PATENT DOCUMENTS

2015/0126269 A1* 5/2015 Linden .................... A63F 13/46
463/23

* cited by examiner

*Primary Examiner* — William H McCulloch, Jr.
*Assistant Examiner* — Ankit Doshi
(74) *Attorney, Agent, or Firm* — Polsinelli LLP

(57) ABSTRACT

The present disclosure describes methods and systems directed towards generating and utilizing earned gameplay resources for metagaming. The interconnected gameplay is carried out via a first party platform that tracks and integrates user gameplay information coming from a plurality of different video games. The first party platform gameplay information is used to affect the user's performance and progress within a separate game which in turn can be used to affect the progress and performance of video games associated with the first party platform.

19 Claims, 7 Drawing Sheets

UTILIZING EARNED GAMEPLAY RESOURCES FOR METAGAMING

BACKGROUND

Field of Invention

The present invention generally relates to video games. More specifically, the present invention relates to utilizing earned gameplay resources for metagaming.

Description of the Related Art

In the video game industry, new video games are constantly being developed, published, and marketed. The video game industry is a multi-billion dollar industry. For example, the video game industry within the United States alone generated around $30 billion in revenue in 2016.

With the numerous video games currently available, any single video game that is developed and published by a company may have a variety of different lifespans based on different factors such as replayability, story, gameplay, multiplayer support, and downloadable content (DLC). Depending on the strengths or weaknesses of the different factors, many players may be drawn to (and kept engaged) with a video game for various lengths of time (e.g. a week to a few months or even years). With the numerous numbers of video games available and new ones coming out on a regular basis, many players may easily be drawn to the next "new" video game.

Currently in the eighth generation of consoles, consoles generally have a lifespan of about six years. During this span, hundreds of video games may be developed and published that are compatible with each console. Some video games may be played throughout the lifespan of the console while others may be played for a limited period of time and subsequently forgotten. Thus a challenge that arises is implementing (with a specific console) a system that allows for the renewed engagement of older video games as well as facilitates longer engagement of newer video games. Such solution would take advantage of the vast library of video games. Furthermore, this solution would require minimal additional marketing costs and would allow for another source of revenue (especially for older video games) during the lifespan of the console.

Another challenge that is being addressed is providing a system that facilitates increased time spent playing video games. The NPD (National Purchase Diary) group identifies core gamers as those that play more than five hours of video games a week. There are over 34 million core gamers within the United States alone. On average, these core gamers are playing video games for an average of 22 hours every week. However, with daily commutes, work, and school, users may find themselves away from home for a significant amount of time thereby preventing them from playing their video games on their console. For this reason, mobile video games are a growing portion of the gaming industry whereby users are able to essentially play video games wherever they go. Thus there is a challenge to implement a system that also utilizes aspects of mobile video games in order to draw the user back into playing their console specific video games.

SUMMARY OF THE CLAIMED INVENTION

A method for utilizing earned gameplay resources for metagaming is presently claimed. The method begins by establishing conditions that identify gameplay data associated with a first video game and a second video game (i.e. metagame). The method monitors gameplay data from the first video game and processes the gameplay data in order to provide modifications for a user with respect to the second video game. As the user plays the second video game, user gameplay of the second video game is also monitored. The user is then able to request modifications to the first video game by using the monitored gameplay data associated with the second video game. Upon request, the second video game gameplay data is used to modify gameplay of the first video game.

Another method for utilizing earned gameplay resources for metagaming is also presently claimed. The method begins by establishing conditions that identify gameplay data associated with a variety of different games within a first set of video games and a second video game (i.e. metagame). The method monitors gameplay data from the first set of video games and processes the gameplay data in order to provide modifications for a user with respect to the second video game. As the user plays the second video game, user gameplay of the second video game is also monitored. The user is then able to request modifications to one or more of the video games within the first set of video games by using the monitored gameplay data associated with the second video game. Upon request, the second video game gameplay data is used to modify gameplay of one or more of the first set of video games.

A system for utilizing earned gameplay resources for metagaming is also presently claimed. The system includes a resource server that is used to establish a first set of conditions that identifies gameplay data associated with a first video game and to process user gameplay data based on the first set of conditions. A first party platform monitors user gameplay with respect to the first video game. The processing being performed by the resource server is used to provide modifications for a user with respect to a second video game. The system also includes a metagame server that is used to establish a second set of conditions that identifies gameplay data associated with the second video game. The metagame server also monitors user gameplay while the user is playing the second video game. A promotion server is included in the system to receive user requests to modify gameplay of the first video game using gameplay data associated with the second video game. The promotion server processes the user gameplay data associated with the second video game and provides corresponding modifications for the first video game based on the second set of conditions.

DETAILED DESCRIPTION

The present disclosure describes methods and systems directed towards allowing users to utilize earned gameplay resources for metagaming. The earned gameplay resources are associated with a first party platform that tracks user gameplay information in connection with a first group of video games. The tracked information from the video games is subsequently used to affect the same user's progress and performance in a separate video game (herein after referred to as the Metagame). The user's performance and progress within the Metagame can subsequently be used to affect the progress and performance within video games associated with the first party platform. The conditions pertaining to how the gameplay information between the first party platform video games and the Metagame are used to affect each other are established via parties associated with the video game or the first party platform. These conditions are implemented as a way to encourage continued user play of a variety of different video games.

As described herein, the first party platform may coincide with a network that supports a gaming console. The first party platform includes various application programming interfaces (APIs) and related software that facilitates the tracking of gameplay information associated with both new and old video games associated with the first party platform so that the information can be used with respect to the Metagame. The gameplay information would include tracking gameplay resources that users would earn while playing video games that can subsequently be used in the Metagame.

Described in further detail below, the Metagame may generally be understood as a standalone video game. The Metagame can be primarily hosted via a virtual network or in the cloud. The Metagame may have its own unique set of rules and characteristics used to define the user gameplay experience playing the Metagame. User progress within the Metagame would be influenced by the user's gameplay data from the Metagame. This in turn will influence subsequent participation within the first group of video games. The relationship between the first group of video games and the Metagame aims to encourage additional gameplay as the user's progress and performance within each group of video games would impact the other over time.

Figure 1:
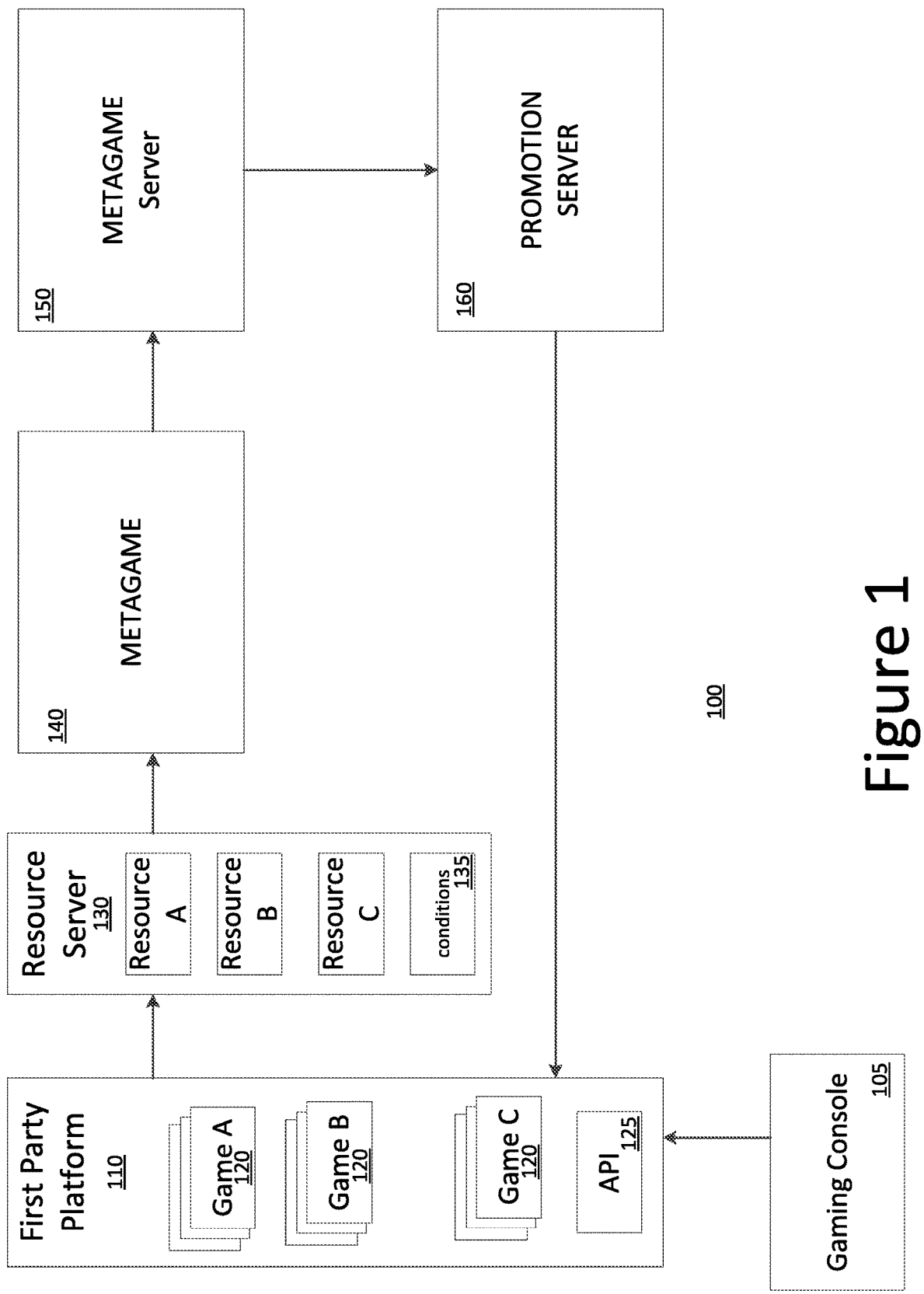
FIG. 1 illustrates a system for implementing the Metagame.

FIG. 1 illustrates a system 100 for implementing the Metagame. The system 100 encourages and rewards users who play a variety of different video games 120 (e.g. game A, game B, game C) on their respective gaming consoles 105 whereby the video games 120 are supported via the first party platform 110. The system 100 encourages the user to play many different video games 120 by using the user gameplay information associated with each played game 120 to progress the user performance within a separate game (herein after referred to as a Metagame 140). For example, as users play the different video games 120 associated with the first party platform 110, these users may simultaneously acquire resources that can be used to advance within the Metagame 140. Other conditions, such as satisfying objectives or achievements or beating the game 120, can also be used to advance the user's progress within the Metagame 140. The user's progress within the Metagame 140 can subsequently be used to influence the user's performance or progress within the different video games 120 supported via the first party platform 110. In this way, the system 100 allows for gameplay between the video games 120 associated with the first party platform 110 and the Metagame 140 to be interconnected and to influence each other. A user would then be encouraged to play either the video games 120 via the gaming console 105 or be engaged with the Metagame 140 until the user is at the gaming console again 105 to continue play of the video games 120.

The first party platform 110 corresponds to, for example, a gaming console 105. In some embodiments, the first party platform 110 may also pertain to a computing device (e.g. personal computer). The first party platform 110 allows for the gaming console 105 to interact with a vast library of different video games 120 compatible with the system 100 associated with the Metagame 140. These different video games 120 may include past video games that have been published, recently published video games, as well as those video games not have not been officially published (e.g. alpha/beta tests). The first party platform 110 includes various application programming interfaces (APIs) 125 and related software that facilitates in the tracking of gameplay information with respect to the different video games 120 for use with the Metagame 140. Further details regarding the first party platform 110 will be provided below in FIG. 3.

The first party platform 110 tracks user performance within the different video games 120 through a variety of different means. For example, some first party platforms 110 may implement achievement systems that award the user with points or trophies. These achievements may be pre-programmed with respect to the different video games 120 and provided to the first party platform 110 to display once it has been achieved within the different video games 120.

Each of the video games 120 may be capable of monitoring the user gameplay for the condition(s) associated with fulfilling the various achievements. For example, most achievements may correspond to the user fulfilling some sort of condition within the game: beating a particular stage, finding a particular object, exploring a particular area, or playing for a certain amount of time. Once the game 120 has identified that the user has fulfilled a condition for an achievement, notification about the achievement can be provided to the user (via an in-game notification) but also can be provided to the first party platform 110. The accumulation of multiple awards (e.g. points, trophies) by the first party platform 110 can be used, for example, to represent how much the user plays video games in general, how well the user plays a particular game, and how many resources the user has acquired during a span of time. These awards can be associated with a user profile associated with the first part platform 110.

For video games 120 that do not have an implemented achievement system at the time of publishing, the first party platform 110 allows for associated parties (e.g. developer/publisher) to implement an achievement system after the fact via the use of APIs associated with the first party platform 110. These achievements, although not trackable directly within the video games 120 since the video games 120 may not have the programming to do so, can instead be directly monitored via the first party platform 110. The first party platform 110 may be capable of performing the monitoring for the fulfillment of the condition(s) associated achievements in place of the game (as described above).

The custom achievement system implemented via the associated parties (for those video games that do not have pre-programmed achievements) may be monitored for by the first party platform 110. The first party platform 110 can monitor for the condition(s) for fulfilling the custom achievement as well as how to determine if such condition (s) are fulfilled. Details such as what information to search for from the gameplay data and where such data is found may need to be provided for the custom achievement so that the first party platform 110 is capable of monitoring for the achievement. The first party platform 110 would be capable of retrieving the relevant information associated with gameplay of the game 120 that corresponds to the same conditions described above for the various achievements.

Even if video games have pre-programmed achievements as described above, the custom achievement system implementable via the API 125 of the first party platform 110 may also allow associated parties to implement additional achievements at a future date. This could provide additional achievements for users who have obtained all previous achievements providing new challenges and accomplishments for users to strive for. For the purpose of the present application, these additional achievements could also allow for implementation of more conditions that would affect user gameplay (e.g. award additional resources) within the Metagame 140.

As noted above, gameplay information from the different video games 120 that users may play with respect to the first party platform 110 will be used to progress (or at least in some way affect) the user's performance within the Metagame 140. The different video games 120 may correspond to all past, present, and upcoming video game titles that are compatible with the first party platform 110. Each of these different video games 120 may be associated with one or more genres (e.g. first person shooter, role playing, sports, action). As newer video games are introduced to the public, the first party platform API 125 also allows for the integration of the newer video games so that these newer video games can be implemented within the overall system 100.

By using the tracked information from the user performance within the different video games 120, the user's progress within the Metagame 140 can be affected. However, how the Metagame 140 is affected would be controlled by the resource server 130.

The resource server 130 can be implemented via a computing device associated with the first party platform 110 (or in some embodiments be implemented within the cloud). The resource server 130 would be used to translate the information coming from the first party platform 110 (e.g. achievements) that would be used with respect to the Metagame 140. Although achievements (e.g. trophies, points) could be used to identify how the user performance within the Metagame 140 could be affected, the resource server 130 could also (in other embodiments) receive user gameplay data from the video games 120 directly. The gameplay data from the video games 120 could be used by the resource server 130 in a similar manner in order to determine how the user Metagame 140 would be affected.

As illustrated in the figure, an example way to influence the Metagame 140 would be identifying the type of resources that the user would be able to earn from playing other video games that can be used within the Metagame 140 based on the user gameplay data of the other video games. For example, if the Metagame 140 requires three different types of resources to progress within its environment (e.g. Resource A, Resource B, Resource C), the resource server 130 would be used to determine how much of each resource would be provided for the user as the user plays different video games. In this way, user gameplay associated with the video games 120 of the first party platform 110 could influence how the user gameplay within the Metagame 140 progresses.

Regarding how gameplay associated with the first party platform 110 translates to the different resources, for example, the resource server 130 may include instructions that identify gameplay with particular video games (or even groups of video games) to correspond with particular resources compatible with the Metagame 140. In an embodiment, user gameplay data associated with sports video games may correspond to providing resource A to the user within the Metagame 140. Similarly, user gameplay data with role playing video games may correspond to providing resource B to the user within the Metagame 140. The system 100 can be organized so that the user is incentivized to participate in a variety of different video games in order to effectively participate within the Metagame 140. Other embodiments may also organize newly released video games to correspond with a particular resource as well and based on the game's age what resource (or how much of the resource that is provided) can also be modified. Any number of resources may be applicable within the Metagame 140 and the conditions by which users acquire those resources corresponding to gameplay of various video games can be varied based on the Metagame 140 design.

Furthermore, with respect to each resource, user gameplay data can influence how much of a resource can also be provided for use within the Metagame 140. For example, merely playing for a pre-determined period of time (e.g. 1 hour) or satisfying various (easy) conditions (e.g. completing a quest) within the corresponding game 120 can provide a first amount of resources. However, obtaining various harder achievements or even beating the game can provide a greater amount of resources. The instructions can vary between different video games and can be established, for example, by the developer or associated party with each video game.

Metagame specific resources may not be the only way that user gameplay data from the video games 120 associated with the first party platform 110 can influence the Metagame 140. In some embodiments, playing particular video games 120 can also allow for the unlocking of special features (e.g. skill trees, talents) that facilitate user gameplay. Furthermore, additional benefits may include enhancements to Metagame gameplay such as increased build time speed, enhanced character statistics, decreased resource cost or any other relevant benefit associated with the Metagame 140. Additional benefits may also include adding or unlocking new areas or quests (e.g. additional content) that were previously inaccessible via normal gameplay or providing these same new areas or quests in an accelerated manner.

As described above, the resource server 130 allows for a vast variety of different ways that user gameplay associated with the video games 120 of the first party platform 110 to influence the Metagame 140. These ways can be introduced into the Resource Server 130 and stored within a conditions database 135. Much like how video games (e.g. new) can be implemented into the first party platform 110 via an API 125, the resource server 130 can similarly facilitate implementation of how those video games (e.g. new) influence the Metagame 140 by allowing for the update of the conditions database 135. In some embodiments, new conditions may also be added to the conditions database 135 to one or more supported video games so that users have additional ways to impact progress within the Metagame 140.

As used herein, the Metagame 140 refers to a separate self-contained game that has its own set of rules and gameplay distinct from the video games 120 associated with the first party platform 110. Although we describe the Metagame 140 as a single game, in practice, there may be multiple different types of Metagames that can be compatible with the system 100. The system 100 can control how the video games 120 of the first party platform 110 interact with the different available Metagames 140.

The Metagame 140 may be carried out via a variety of different genres of video games. For example, the Metagame 140 may be a simulated builder-type game where the user is in charge of constructing objects from scratch using in-game resources (obtained via the gameplay data from the video games 120). These objects may consist of tools or supplies that can be used to construct vehicles, buildings, and other items. The in-game resources may also be usable to purchase different objects needed to construct the same vehicles, buildings, and other items. As the user progresses within this type of Metagame 140, the user may begin to produce specific in-game Metagame resources or achieve certain milestones.

The Metagame 140 may also be carried out via a role-playing game where the user is in charge of an avatar within a fantasy world. The user is in charge of training the avatar and purchasing equipment for use within the fantasy world. In-game resources (obtained via the gameplay data from the video games 120) may be used to strengthen the character and purchase new equipment. As the user progresses within this type of Metagame 140, the user may acquire in-game Metagame resources from various adventures.

As the user progresses within the Metagame 140, the user is able to acquire Metagame-specific resources that can then be used (e.g. traded in/consumed) in order to obtain exclusive content or benefits associated with the different video games 120. In this way, the user's progress within the different video games 120 can be used to affect gameplay within the Metagame which in turn affects the different video games 120.

In some embodiments where the user may acquire Metagame-specific resources within the Metagame 140, the system 100 can allow for the user to acquire additional Metagame-specific resources at an increased rate or in greater quantities than is possible without the use of the system 100. Furthermore, there may be embodiments where resources or in some cases features (e.g. skill trees, bonuses) are not accessible without the use of gameplay data (e.g. resources) from the first party platform 110 via the system 100. As described above, such bonuses may include enhanced character statistics, increased resource generation, reduced cost for purchasing objects within the Metagame, etc. . . . . Such bonuses would be based on the specific Metagame and may vary accordingly.

As described above, the Metagame 140 may be a virtual game hosted in the cloud, as opposed to the video games 120 associated with the first party platform which may primarily be video games associated with different entertainment systems (e.g. gaming consoles). As such, the Metagame 140 may be compatible with different computing devices (e.g. mobile phones, tablet) compared to the devices (e.g. console) which the video games 120 are played on.

Similar to the resource server 130, the Metagame server 150 is used to affect how the video games 120 associated with the first party platform 110 can be affected by the Metagame 140. This is carried out by using information from the user performance within the Metagame 140.

The Metagame server 150 can be implemented via a computing device (or in some embodiments be implemented within the cloud) associated with the Metagame 140. The Metagame server 150 would be used to translate the information coming from the Metagame 140 (e.g. Meta-Game specific resources or achievements) that would be used to modify gameplay associated with the video games 120.

The promotion server 160 contains all the various modifications to the video games 120 associated with the first party platform 110 that is currently available. The promotion server 160 may include the different modifications that can be obtained via user play of the Metagame 140 such as different skins for characters as well as bonuses/benefits that facilitate user gameplay such as increased resource gains. In some cases, these bonuses/benefits may be exclusive to the system 100 in that users would be only able to obtain such modifications to the game 120 via participation in the Metagame 140.

Promotion Server 160 would include a database that includes the list of possible modifications that can be implemented within the video games 120 as well as an API that would allow for the promotion server 160 to be updated for various conditions such as implementing new video games or adding new modifications (and conditions for obtaining the modifications) to existing video games 120 within the first party platform 110. These modifications can be applied to one or more video games and would include instructions regarding how such modifications would be implemented. For example, modifications for the video games 120 may include enhanced character statistics, increased resource gains, alternate skins or color schemes, and new exclusive game content.

In an embodiment, users may acquire Metagame-specific resources that can be exchanged for various benefits within the various video games 120 associated with the first party platform 110. Different modifications may cost different amounts of the Metagame resources as indicated by the promotion server 160. In order to receive the benefits, the user may be required to provide an exchange request within the Metagame highlighting the benefit the user would like to obtain with the respective game(s) 120 that the benefit would be applied to. The exchange request may be entered via a specific user interface within the Metagame 140 that would subsequently be transmitted to the Metagame server 150 for processing.

Figure 2:
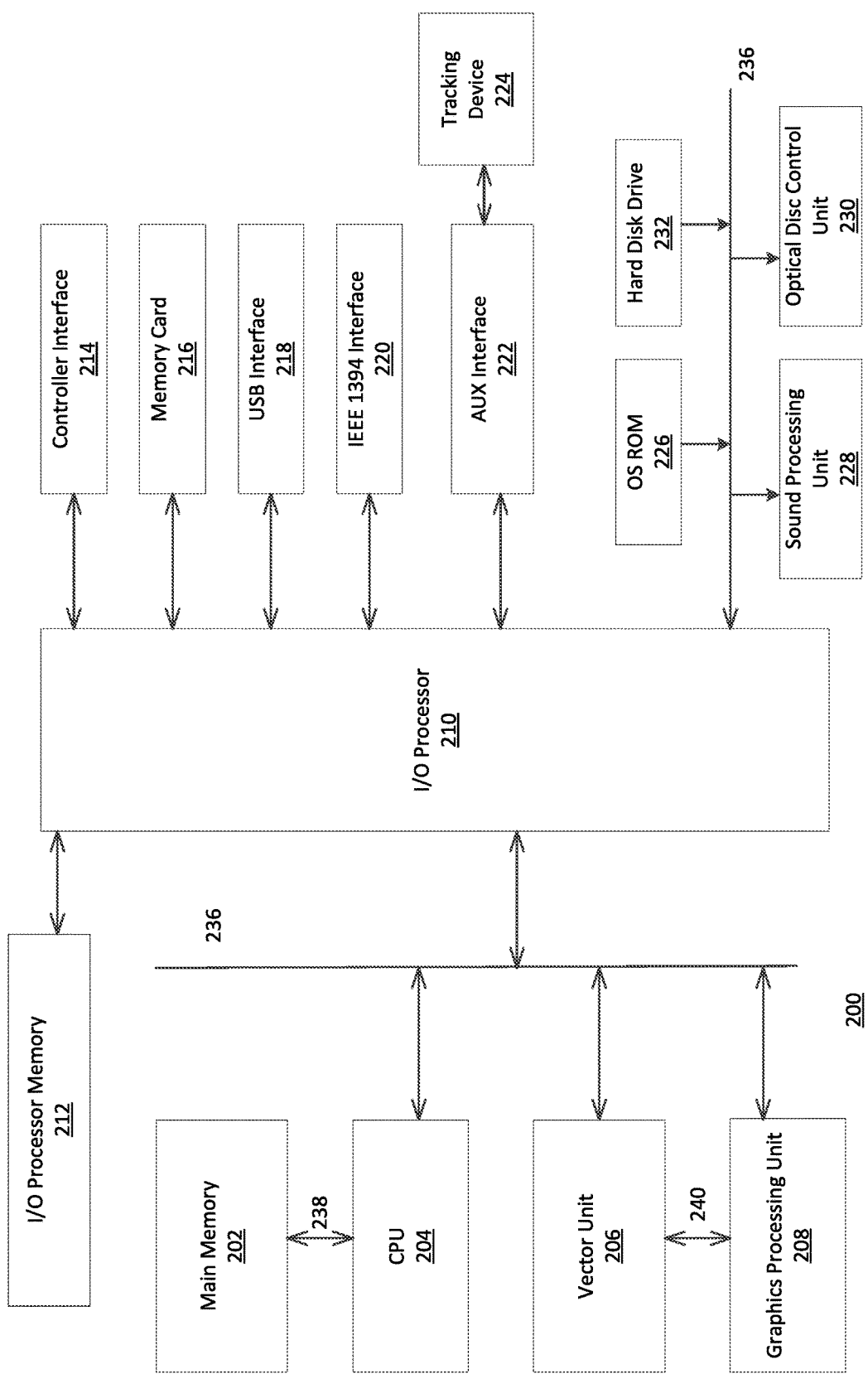
FIG. 2 illustrates an example gaming console of FIG. 1.

FIG. 2 is an example gaming console 200 used in context of the system for interconnected gameplay of FIG. 1. The gaming console 200 (which in some cases may also include other computing devices such as desktops, laptops, tablets, and mobile devices is a device that the user can utilize to play various video games associated with the first party platform of FIG. 1. Furthermore, the gaming console 200 allows the user to connect with the first party platform associated with the video games so that user gameplay can be monitored and recorded.

The gaming console 200 may include various elements as illustrated in FIG. 2, however, it should be noted that the elements are exemplary and that other embodiments may incorporate more or less than the elements illustrated. With reference to FIG. 2, the gaming console 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The gaming console 200 further includes an operating system read-only memory (OS ROM) 226, a sound processing unit 228, an optical disc control unit 230, and a hard disc drive 232, which are connected via a bus 234 to the I/O processor 210. The gaming console 200 includes at least one tracking device 224.

The tracking device 224 may be a camera, which includes eye-tracking capabilities. The camera may be integrated into or attached as a peripheral device to the gaming console 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to gaming console 200 that captures voice data. The microphone may conduct acoustic source localization and/or ambient noise suppression. The microphones may be usable to receive verbal instructions from the user to schedule, retrieve and display content on the gaming console 200.

Alternatively, tracking device 224 may be the controller of the gaming console 200. The controller may use a combination of built-in accelerometers and infrared detection to sense its position in 3D space when pointed at the LEDs in a sensor nearby, attached to, or integrated into the console of the entertainment system. This design allows users to control functionalities of the gaming console 200 with physical gestures as well as button-presses. The controller connects to the gaming console 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the gaming console 200 instead be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the gaming console 200 provides instructions via the controller interface 214 to the CPU 204. For example, the user may instruct the CPU 204 to store certain information on the memory card 216 or instruct the user device 200 to perform some specified action. Example controllers associated with the controller interface 214 may include a touch-screen, keyboards and game controllers.

Other devices may be connected to the gaming console 200 via the USB interface 218, the IEEE 1394 interface 220, and the AUX interface 222. Specifically, a tracking device 224, including a camera or a sensor may be connected to the user device having the first party portal 200 via the AUX interface 222, while a controller may be connected via the USB interface 218.

Figure 3:
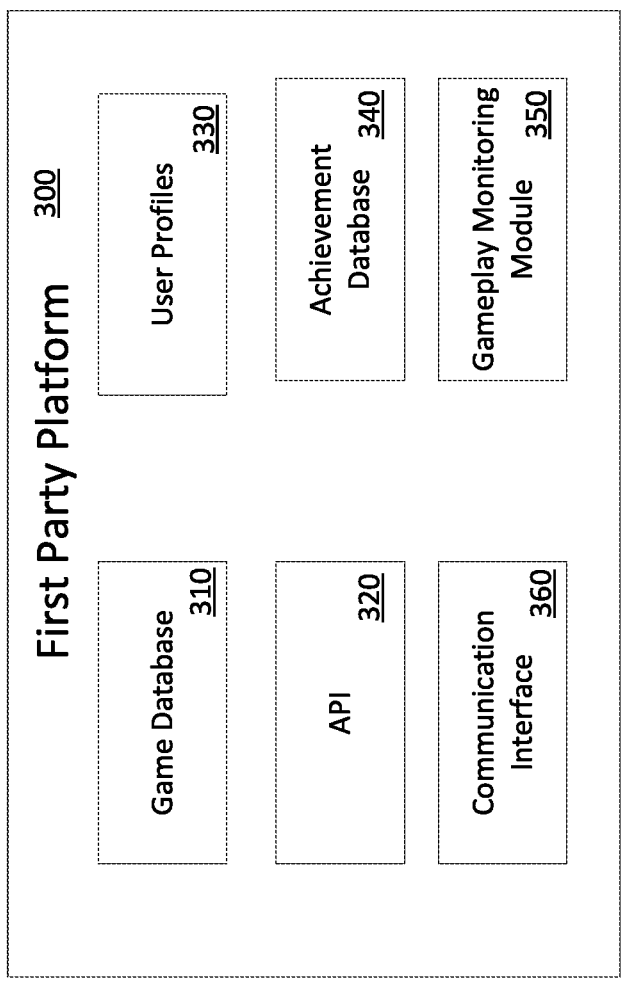
FIG. 3 illustrates an example first party platform of FIG. 1.

FIG. 3 illustrates an example first party platform 300 of FIG. 1. As described herein, the first party platform 300 is a network used to integrate and support video games associated with a particular platform (e.g. gaming console). The first party platform 300 may be implemented via a plurality of computing devices (e.g. servers) and/or within the cloud.

The first party platform 300 includes a number of different features that can be used to facilitate the interconnected gameplay. As illustrated in FIG. 3, the first party platform 300 includes a database 310 of all video games that are currently supported by the first party platform 300. The game database 310 may include information used by the gaming consoles to execute instances of the game in the cloud using the first party platform. This may allow users to participate in multiplayer video games with other users on a shared gaming network. In some embodiments, users may download necessary information from the game database 310 to execute the particular game on the user gaming console. This may be helpful in allowing users to download updates (e.g. downloadable content) for executing a single player game directly on the gaming console.

Since new video games are constantly being published and released for user consumption, an application programming interface (API) 320 is provided within the first party platform 300 to allow publishers to update the game database (and as discussed later the achievement database) with new information used for new video games as needed. The API 320 includes an interface that allows for publishers to upload new game information to be stored within the game database.

Users may also have their own user profiles 330 stored within the first party platform 300. The user profiles 330 may include information such as what video games the user has played, gameplay details regarding progress within each of those video games, as well as information (e.g. achievements, trophies) regarding how well the user has performed within each of those video games. The user profile 330 may also include numerous other statistics that can be used to further characterize the user (e.g. gameplay behavior) associated with the video games with the first party platform.

The achievement database 340 is used to store the various achievements that are used by the gameplay monitoring module 350 in situations where no such achievements are pre-programmed. As described above, achievements may consist of conditions within the game that (once fulfilled) are used to highlight an accomplishment that the user has achieved within the game. These achievements may include specific events or thresholds that are intended to pose a challenge and that users may seek to overcome. Some video games have achievement systems programmed within the context of the game (e.g. pre-programmed) so that when the user fulfills certain conditions during the course of the game, the game can provide the notification to the user. In some cases, this notification can also be provided to the first party platform 300 so that it can be recorded within the user profiles 330.

There may be many video games that do not have an achievement system built in. However, to allow for gameplay data to be quantifiable by the gameplay monitoring module 350 (and thus usable by the system with respect to the Metagame), some metrics would need to be implemented so that these custom "achievements" can be used to characterize user gameplay in video games where no achievement system is present. The API 320 can be used by different parties (e.g. publisher, Metagame administrator) to generate various metrics or conditions that act as achievements that can be used to characterize a user's gameplay data specific to that game that needed the custom "achievements". It may also be possible to generate generic metrics or "achievements" that can be usable with all video games (e.g. beating the game or playing for a certain amount of time).

The achievement database 340 would also include instructions (usable by the gameplay monitoring module 350) directing where information for fulfillment of the metrics can be found. Furthermore, since information from video games may be stored in different locations and different formats based on the game or publisher, the achievement database 340 may also include conversion tables that facilitates in translating game-specific information to a common format that can be understood by the user and/or resource server.

The gameplay monitoring module 350 receives information from the various video games being played by the user. In situations where the video games have ways for tracking user progress during gameplay, such information can be provided for direct use by the gameplay monitoring module 350. For example, such information may include achievements, time played log, accuracy, kill-death ratio, and character statistics within game. This information already characterizes a particular user gameplay and can be transmitted to the resource server (as illustrated in FIG. 4) using the communication interface 360.

In situations where the video games do not track user progress during gameplay (e.g. those that do not include an achievement system), the gameplay monitoring module 350 may use the custom metrics stored within the achievement database 340. The gameplay monitoring module 350 would need to be retrieved game data from the game database 310 as well as gameplay information coming from the user. The gameplay information coming from the user is then processed (e.g. transformed) into a form that can be usable by the resource server. For example, the gameplay monitoring module 350 (via the achievement database 340) may be instructed to retrieve information from specific portions of the user gameplay data. This information may be stored in various different formats based on the type of game or publisher associated with the game. In any case, the information would need to be processed into a common format that is understood by the resource server. The gameplay monitoring module 350 (along with the achievement database 340) carries out this transformation needed for integrating the different video games.

Figure 4:
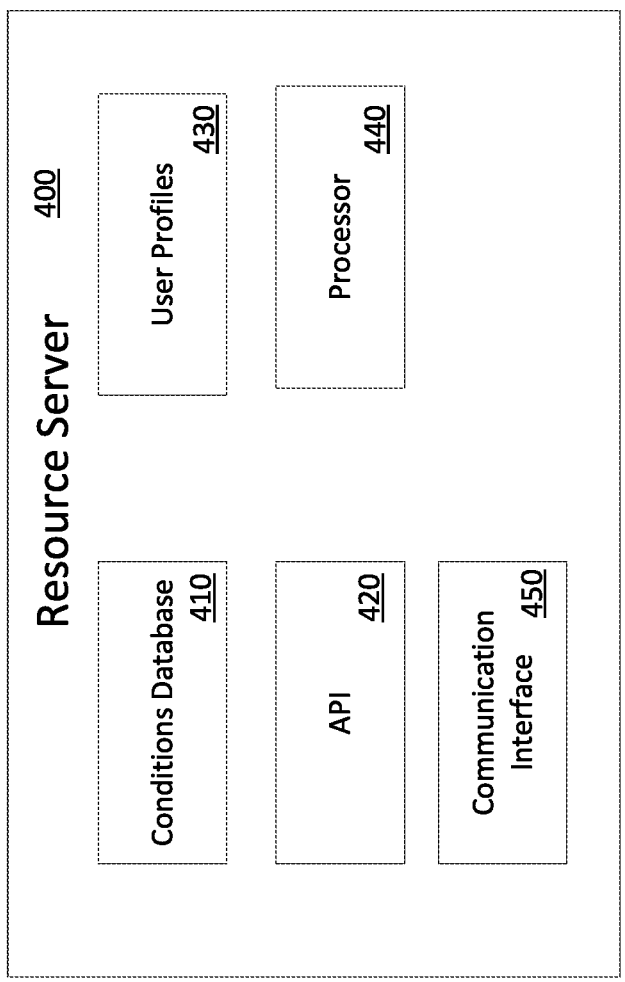
FIG. 4 illustrates an example resource server of FIG. 1.

FIG. 4 illustrates an example resource server 400 of FIG. 1. The resource server 400 is responsible for using the gameplay information of the user from the first party platform in order to determine how the user gameplay within the Metagame will be affected.

As described above, gameplay data coming from a particular game (or group of video games) may correspond to a particular feature (e.g. resource, benefit) associated with the Metagame. The correspondence between how user gameplay from different video games affects the user Metagame experience would be stored within the conditions database 410. For example, the stored conditions would be used to identify when certain events from the gameplay data coming from the first party platform would allow for the user to be awarded with resources of a particular type for use within the Metagame when achieved. Furthermore, the stored conditions can also dictate conditions regarding how many times and when the condition can be satisfied by the user while playing within the corresponding game.

These stored conditions may be generic across all video games such as whether the user has beaten the game and how long the user has been playing today. Some conditions may be specific to a subset of video games such as the user's kill death ratio in first person shooters, or what level the user's main character is currently at in role playing video games. Lastly, some conditions may be specific to a particular game such as whether the user beat a specific stage, boss, or objective.

At least with the first two groups of conditions covering more than one game, the conditions database would also include instructions (usable by the processor 440) to help map and translate the gameplay data coming from the different video games into a common format. This common format would be usable by the system of the present invention to identify what effects should be provided with respect to the user Metagame experience.

As described above, completion of a condition could award the user with various different bonuses or resources that can be used within the Metagame. Subsequently to the completion of the condition, information regarding user completion of the condition would be recorded within the user profile 430. This is performed so that some conditions that would only be allowed to be completed one time would have a way to prevent repeat completion of the same condition.

Not all conditions stored within the conditions database 410 may be a one-time only completion event. There may be conditions that can be completed a pre-determined number of times, may be completed any number of times within a pre-determined period of time, or may be completed any number of times with no time limit. In these situations where the condition can be completed multiple of times, information may be recorded indicating that the user completed the condition as well as a number of times that the condition was previously completed. Determination regarding whether the condition can still be fulfilled can instead be determined based on the condition details stored within the condition database 410 associated with the corresponding condition.

The API 420 would allow parties (e.g. publishers) to update the conditions database for their respective video games so that the video games can be implemented with the Metagame. Furthermore the API 420 would allow implementation of conditions (to be stored within the conditions database) for older video games or video games not initially made compatible with the system of the present invention but having gameplay that could be tracked via the first party platform as described above.

The user profile 430 would be used to store information about the user. In particular such information may include associating the user profile associated with the first party platform with the user profile associated with the Metagame. Furthermore, the user profile 430 may include the various achievements that have already been fulfilled by the user via play of the various video games associated with the first party platform. Such information would be recorded and stored with the user profile 430 so that users may be prevented from repeatedly completing the same achievements (if applicable).

The processor 440 of the resource server 400 would carry out the processing of the gameplay data coming from the first part platform and comparison with the condition database 410 in order to modify the gameplay information associated with the user experience in the Metagame.

The communication interface 450 facilitates communication with obtaining the gameplay data coming from the first party platform as well as providing instructions to the Metagame regarding how the game should be modified for the user based on the condition(s) that are satisfied to award the user with additional resources or benefits as appropriate.

Figure 5:
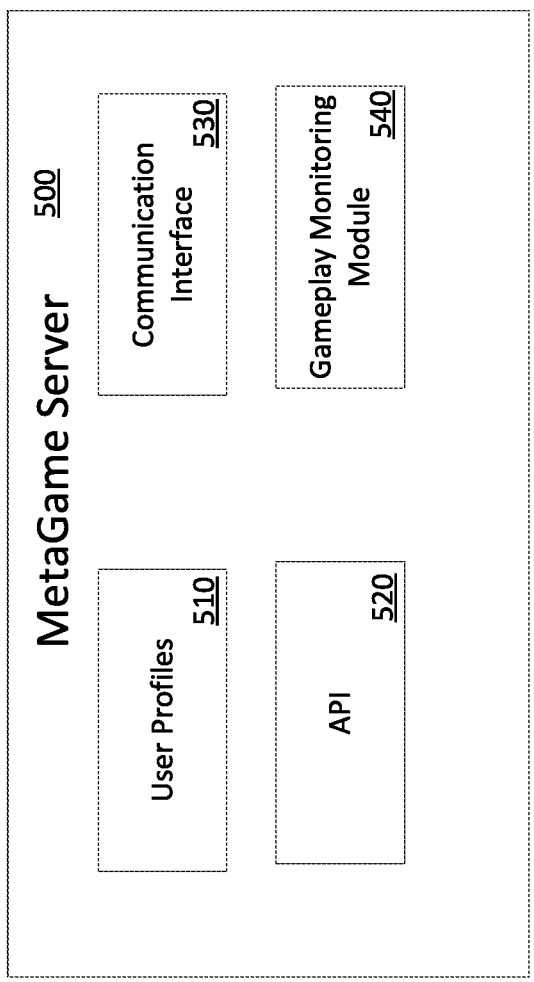
FIG. 5 illustrates an example Metagame server of FIG. 1.

FIG. 5 illustrates an example Metagame server 500 of FIG. 1. The Metagame server 500 serves a similar function with respect to the Metagame compared to the above described resource server detailed in FIG. 4. Whereas the resource server received gameplay information from the first party platform in order to determine how the Metagame should be affected, the Metagame server 500 takes gameplay information from within the Metagame in order to determine how video games associated with the first party platform would be affected.

The Metagame server 500 includes a user profile database 510 that contains information associated with each user. The user profile database 510 would be used to store the corresponding progress of the user gameplay in the Metagame. This information can be used to synchronize the user's progress and status within the Metagame across different devices used to participate within the Metagame.

The API 520 allows parties (e.g. third party publishers) to develop and publish their own Metagame to be incorporated in the overall system (as illustrated in FIG. 1). The API 520 also allows corresponding parties of the Metagame to provide updates to how the Metagame operates. The communication interface 530 facilitates communication between the Metagame, the Metagame server, and the promotion server.

Lastly, the monitoring module 540 facilitates monitoring user gameplay data coming from the Metagame. Such information obtained via the monitoring can be recorded and stored in the corresponding user profile 510. The monitored gameplay data can be used to award users with Metagame specific resources. In some cases, achieving certain conditions within the Metagame may unlock benefits that can be used within one or more video games associated with the first party platform.

Figure 6:
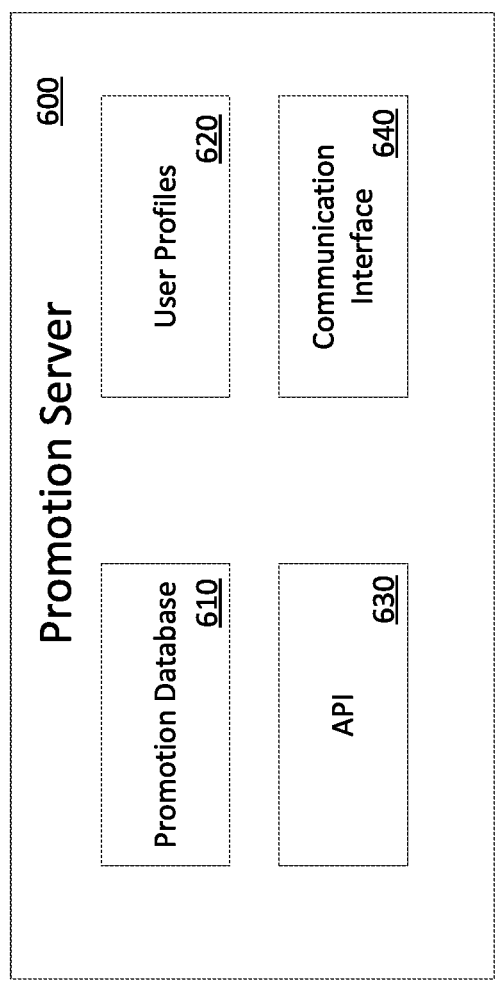
FIG. 6 illustrates an example promotion server of FIG. 1.

FIG. 6 illustrates an example promotion server 600 of FIG. 1. The promotion server 600 contains the information regarding how the gameplay information coming from the Metagame would be used to modify the user gameplay with one or more video games associated with the first party platform. For example, these conditions can specify resources to be exchanged for the implementation of a bonus within a particular video game. The promotions may also be for a limited time (e.g. one week) or for a pre-determined number of redemptions (e.g. first 100 uses). The information stored within the promotion server 600 would also include instructions with respect to each video game regarding how the modification will be implemented.

The promotion server 600 includes the promotion database 610 that includes the different promotions available for use in connection with the video games associated with the first party platform. These promotions, as described above, may correspond with the benefits and bonuses that can be unlocked or implemented with the video game using the Metagame-specific resources. The promotion server 610 may also include a user profile 620. The promotion server 600 may also include the user profile 620 that can be used to store information related to different users. Information may include, for example, what benefits and bonuses have already been unlocked or implemented within their video games, and what video games associated with the first party platform and what Metagames the user is playing. Some benefits and bonuses may also be restricted to certain Metagames.

Additional features such as the API 630 would allow the promotion server 600 to be updated with new promotions or be used to also modify existing promotions. For example, while some promotions may be available when a video game is published, some promotions may be added a period of time after the video game has been published. Finally, the communication interface 640 facilitates communication between the Metagame and the video games associated with the first party platform.

Figure 7:
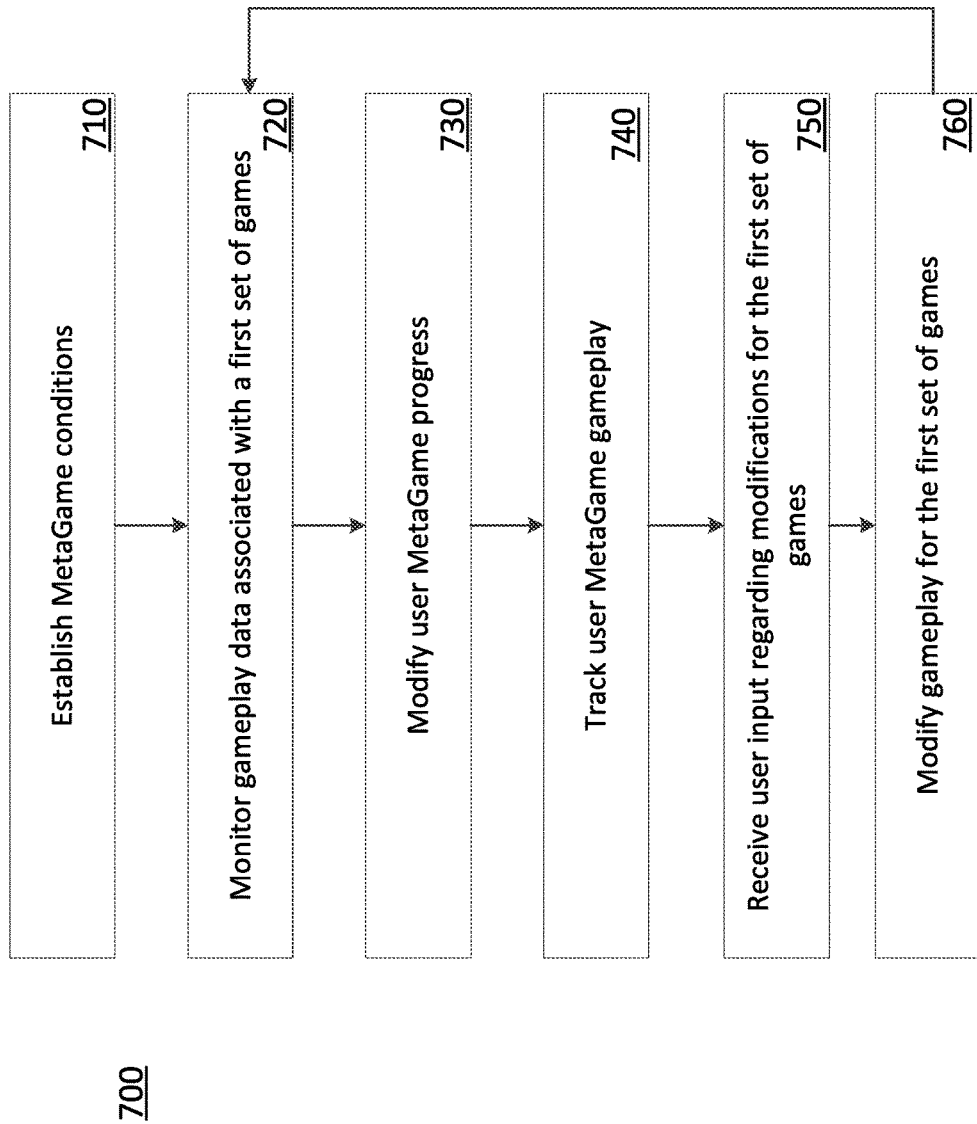
FIG. 7 illustrates a method for enabling the earned gameplay resources for metagaming.

FIG. 7 illustrates a method 700 for enabling the earned gameplay resources for metagaming. As described above, user gameplay information associated with various video games can be used to influence user progress within the Metagame. The user's performance within the Metagame can then be used to influence user participation within the various video games.

In step 710, conditions regarding how gameplay data from the first party platform can be used to modify the Metagame are generated. These conditions can consist of detailing how Metagame specific resources are acquired during play of the various video games. As described above, achievements and gameplay data can be used to award the user with these resources.

In step 720, the user gameplay of various video games associated with the first party platform is monitored. The gameplay data from the video games are used to award the user with the Metagame specific resources so that the user is able to participate within the Metagame.

In step 730, using the gameplay data, the user progress within the Metagame is modified. With the Metagame specific resources awarded from corresponding videogame gameplay data, users would be able to use these resources to progress within the game. In some embodiments, the gameplay data can also be used to unlock or provide access to different portions of the Metagame.

In step 740, the user gameplay within the Metagame is monitored. Similar to step 720 where the user gameplay of the videogames is monitored in order to award resources that can be used within the Metagame, this step monitors user gameplay data associated within the Metagame to award resources that can be exchanged for bonuses or benefits applicable to the various video games.

In step 750, the Metagame receives user input requesting use of Metagame specific information in connection with modification of one or more video games associated with the first party platform. Once the user has acquired sufficient Metagame specific resources or achieved certain conditions within the Metagame, the user can provide a request to implement some form of modification within one or more video games associated with the first party platform. Such request can come in the form of a "trade" between available Metagame specific resources to fulfill a cost for the corresponding benefit or bonus the user would like implemented within the video game. For example, the user may wish to trade in 100 Metagame specific resources for a unique skin within a game. In some embodiments, a combination of different resources may be needed for a benefit or bonus.

In step 760, the one or more video games associated with the first party platform has one or more aspects modified based on the Metagame specific information based on the above user request. In the example with the skin, the user may have access to the skin immediately to be used during the next time the user is within the game. In some situations, the ability to acquire the skin may be unlocked but the user would still need to satisfy some video game specific condition to actually acquire the skin within the game.

Steps 720-760 may be repeated. Furthermore, step 710 may be used whenever further updates to the overall method needs to be performed. Such updates may include incorporating new video games or monitored conditions associated with the Metagame (as described above).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for utilizing gameplay resources for metagaming, the method comprising:
   storing in memory information regarding a metagame, the stored information including a set of metagame conditions that identifies gameplay data associated with a first instance of a video game;
   monitoring gameplay data received over a communication network from a user device associated with a user playing the first instance of the video game, the gameplay data indicating completion of one or more achievements within the video game;
   providing metagame resources to the user based on achievements indicated by the monitored gameplay data meeting the stored set of metagame conditions, wherein one or more modifications associated with the metagame are available to the user based on the metagame resources;
   receiving a user request from the user to apply a specified modification associated with the first instance of the video game and the stored set of conditions to a separate instance of a video game, wherein the separate instance of the video game is a separate game play session; and
   modifying a platform hosting the separate instance of the video game in accordance with the user request whereby the metagaming resources generated for the requesting player in the first instance of the video game effectuate a predetermined change in the separate instance of the video game in an amount corresponding to the metagaming resources associated with the specified modification.

2. The method of claim 1, wherein the stored set of metagame conditions includes the one or more achievements within the first instance of the video game.

3. The method of claim 1, wherein the specified modification includes awarding the user resources specific to use within the separate instance of the video game.

4. The method of claim 1, wherein the metagame includes locked content, and wherein the specified modification includes unlocking the locked content.

5. The method of claim 2, wherein the one or more achievements includes one or more custom achievements implemented with the first instance of the video game.

6. The method of claim 1, wherein the specified modification includes incorporating new content into the separate instance of the video game.

7. The method of claim 1, wherein the first instance of the video game is one of a plurality of video games within a first set of video games, wherein the modifications are provided to the separate instance of the video game are provided to the user based on the first set of conditions being met by the gameplay data from the plurality of video games within the first set of video games.

8. The method of claim 7, wherein the modifications applicable to the separate instance of the video game are associated with a different amount of the metagame resources is provided to the user based on the respective gameplay in each different one of the video games within the first set of video games.

9. The method of claim 8, wherein the stored set of metagame conditions specify different achievements specific to each different one of the video games.

10. The method of claim 1, wherein at least one condition from the stored set of metagame conditions is customizable.

11. A system for utilizing gameplay resources for metagaming, the system comprising:
    a resource server that:
       stores information regarding a metagame, the stored information including a set of metagame conditions that identifies gameplay data associated with a first instance of a video game, and
       providing metagame resources to a user based on one or more achievements indicated by gameplay data of the user based on the stored set of metagame conditions, wherein one or more modifications associated with the metagame are available to the user based on the metagame resources;
    a metagame server that monitors the gameplay data received over a communication network from a user device associated with the user playing the first instance of the video game, the gameplay data indicating completion of the one or more achievements within the first instance of the video game; and
    a promotion server that:
       receives a user request from the user device to apply a specified modification to a separate instance of a video game, wherein the separate instance of the video game is a separate game play session, and
       modifying a platform hosting the separate instance of the video game in accordance with the user request whereby the metagaming resources generated for the requesting player in the first instance of the video game effectuate a predetermined change in the separate instance of the video game in an amount corresponding to the metagaming resources associated with the specified modification.

12. The method of claim 1, further comprising storing a plurality of rules associated with the separate instance of the video game.

13. The method of claim 12, further comprising tracking a status of the user within the metagame based on the stored rules.

14. The method of claim 12, wherein processing the user request is further based on the tracked status.

15. The method of claim 3, wherein the specified modifications are associated with a predefined amount of the metagame resources, and wherein identifying the set of metagame resources is further based on the user having accumulated at least the predefined amount of the metagame resources.

16. The method of claim 1, further comprising adding a new condition to the stored set of metagame conditions.

17. The method of claim 16, wherein the new condition is associated with a newly available modification applicable to one or more of the plurality of video games.

18. A non-transitory, computer-readable storage medium, having embodied thereon a program executable by a processor to perform a method for utilizing gameplay resources for metagaming, the method comprising:
storing in memory information regarding a metagame, the stored information including a set of metagame conditions that identifies gameplay data associated with a first instance of video game;
monitoring gameplay data received over a communication network from a user device associated with a user playing the first instance of the video game, the gameplay data indicating completion of one or more achievements within the video game;
providing metagame resources to the user based on achievements indicated by the monitored gameplay data meeting the stored set of metagame conditions, wherein one or more modifications associated with the metagame are available to the user based on the metagame resources;
receiving a user request from the user to apply a specified modification associated with the first instance of the video game and the stored set of conditions to a separate instance of a video game, wherein the separate instance of the video game is a separate game play session; and
modifying a platform hosting the separate instance of the video game in accordance with the user request whereby the metagaming resources generated for the requesting player in the first instance of the video game effectuate a predetermined change in the separate instance of the video game in an amount corresponding to the metagaming resources associated with the specified modification.

19. A method for metagaming, the method comprising:
monitoring gameplay data from one or more play sessions of a first instance of a video game, the play session including one or more players;
generating metagaming resources for each of the one or more players based on the gameplay data;
receiving a request from one of the players to apply a specified modification associated with the generated metagaming resources to a separate instance of a video game, wherein the separate instance of the video game is a separate game play session; and
modifying a platform hosting the separate instance of the video game in accordance with the specified modification, whereby the metagaming resources generated for the requesting player in the first instance of the video game effectuate a predetermined change in the separate instance of the video game in an amount corresponding to the metagaming resources associated with the specified modification.

\* \* \* \* \*